United States Patent Office 3,345,389
Patented Oct. 3, 1967

3,345,389
SEPARATION OF FATTY MATERIALS
Karl T. Zilch, Cincinnati, Ohio, assignor to Emery Industries, Inc., Cincinnati, Ohio, a corporation of Ohio
No Drawing. Filed Sept. 26, 1961, Ser. No. 140,669
10 Claims. (Cl. 260—419)

This invention relates to the separation of glycerides and of fatty acids and particularly to the separation of mono from polyunsaturated fatty acids. The present application is a continuation-in-part of my earlier filed application, Ser. No. 842,189, filed Sept. 25, 1959, now abandoned.

The natural fats consist of the glyceryl esters of mixtures of fatty acids, the composition of the fatty acids and the proportions in which they are present, being dependent upon the source of the fats. The fats derived from marine sources may be as high as 22–24 carbon atoms in chain length and may range from saturated, i.e. containing no double bonds to those containing from 4 to 6 double bonds. The animal fats contain principally $C_{16}$ and $C_{18}$ saturated and $C_{18}$ monounsaturated fatty acids. The vegetable oils, on the other hand, contain large percentages of $C_{18}$ di- and triunsaturated acids.

For a great many industrial uses it is desirable to separate the various fats, in either their natural or partially hydrogenated states, into a fraction containing a high percentage of high melting glycerides, leaving a liquid low-melting fat as the other fraction. Thus, for example, commercial lard, known as white grease, may be separated into a solid fat termed oleostearine and a liquid termed lard oil.

If the fats or glycerol esters are hydrolyzed to yield glycerine and fatty acids, a process commonly termed splitting, there is obtained a mixture of fatty acids whose composition is dependent upon the composition of the original fat. The mixture may be solid at ordinary temperatures if it contains a high proportion of saturated fatty acids or liquid if it contains a high proportion of low molecular weight or unsaturated fatty acids such as oleic, linoleic or linolenic acids.

In the case of fatty acids, it is also desirable for commercial purposes to separate the mixed acids, segregating those having similar physical or chemical properties.

The separation of the solid fatty acids from liquid acids is widely practiced on a commercial scale. The methods originally employed involved chilling the mixed acids to solidify the solid acids and then removing the still liquid portion by the application of hydraulic pressure. This method has been superseded by processes involving solvents. The mixed acids are dissolved in a suitable solvent and the solution cooled under controlled conditions. The solid acids being less soluble crystallize out of the solution, are removed by filtration and the liquid unsaturated acids recovered by evaporation of the solvent.

The separation of the unsaturated liquid acids from each other, although highly desirable for commercial reasons and even though separations have been effected on a laboratory scale, has not been practiced on a commercial scale due to the difficulties involved. The pressing method which is feasible in separating relatively high melting solid acids from the low melting liquid acids is not feasible with liquid acids having rather similar and very low melting points. The solvent crystallization methods used in the laboratory have required excessively low temperatures and repeated separations in order to obtain reasonable yields and a reasonable degree of separation.

Liquid phase separations from solvents which have been proposed have not been adopted due to the high mutual solubility of the various unsaturated acids which renders such separations inefficient.

As a result, the liquid acids available commercially are those mixtures of acids contained in the natural oils or fats or the mixed liquid acids remaining after the solid acids have been removed. To produce oleic acid in which the presence of linoleic or linolenic acids is undesirable is it necessary to start with animal fats having a low content of these acids. Likewise, polyunsaturated acids for, say, drying alkyd resins are obtained from the liquid acids of cottonseed, soya, safflower or linseed oils even though the oleic content may often be higher than is desirable.

It is the principal purpose of this invention to provide a process by which the unsaturated liquid acids may be separated from each other.

It is the further purpose of this invention to provide a process for the solvent separation of unsaturated liquid acids employing temperatures which are feasible in commercial operation.

It is the further purpose of this invention to provide a process which, in addition to separating liquid acids, is sufficiently versatible to also provide an efficient method for the separation of normally solid from normally liquid unsaturated acids.

A still further purpose of this invention is is to provide a process for separating glycerides into fractions of varying melting point.

I have found that the foregoing objectives are achieved by using 2-nitropropane as the solvent for the fatty material to be separated into fractions of varying melting point. This particular compound is readily available at low cost and has a low vapor pressure, thus reducing solvent losses and danger of explosion. In addition, it has the ability to dissolve from about 15 to 25% by weight of the various fatty materials referred to above at room temperatures, this solvent action being coupled with the ability to retain said materials in solution at temperatures down to that at which the particular material being separated crystallizes out without giving rise to a second liquid phase.

Solutions of fatty materials in 2-nitropropane crystallize from the solution at significantly higher temperatures than is the case with many other solvents. At the same time, the crystalline phase which does form is characterized by a coarse, granular structure which permits the liquid phase to be readily drawn off as the crystalline product is washed and suction filtered. This granular structure is in contrast to that obtained when using 1- instead of 2-nitropropane, the 1-nitropropane solution yielding a finely crystalline, rather slimy product, which is very hard to suction filter.

The solvent 2-nitropropane is also unlike 1-nitropropane in that the former yields products of greater color stability. Thus, in operations wherein 1-nitropropane is used to dissolve mixed fatty acids with the resulting solution thereafter being cooled to crystalize out the more highly saturated acids, and with the crystallized acid so obtained being filtered from the mixture and thereafter stripped of solvent by distillation procedures, it is found that the recovered fatty acids are characterized by being color unstable. This is not the case when the solvent employed is 2-nitropropane.

The higher fatty acid crystallization temperatures afforded by the use of 2-nitropropane are particularly advantageous in the separation of the liquid unsaturated acids. With the solvents previously proposed such as isopropylacetate, methanol and acetone it has been necessary to cool solutions to temperatures of from −25° C. to −40° C. to effect a separation of oleic from polyunsaturated acids, while with 2-nitropropane a temperature of from —15° C. to —20° C. is sufficient to give an equivalent separation. Again, crystallization with 2-nitropropane occurs at about a 10° F. higher temperature than with nitrobutane.

In practicing the process of the invention, the fatty material—glyceride or fatty acid—is dissolved in from 3 to 4 times its weight of 2-nitropropane and the solution cooled. The method and rate of cooling are not critical and jacketed batch or continuous crystallizers may be employed. The temperature to which the solution is cooled varies very widely dependent upon the material being fractionated and the product desired. For example, a high melting fraction can be removed from partially hydrogenated cottonseed oil by cooling to only 20° C. Cottonseed oil can be winterized by cooling to 15° C., stearic acid can be separated from oleic by cooling to 0° C., while the crystallization of oleic acid to separate it from the more unsaturated acids from tall oil requires cooling to a temperature of from —20 to —35° C. If desired, the separations may be carried out in two or more stages; for example, solid saturated acids can be removed in a first stage and then with further cooling, oleic acid in a second stage, leaving the more unsaturated acids in solution in the solvent.

The temperature to which the solution must be cooled to achieve the desired separation may readily be determined by a few simple trials and analysis of the product.

After cooling the solution to bring about precipitation or crystallization to the desired degree, the solution is filtered to remove the precipitated fatty material and the solids on the filter washed with fresh solvent to displace the retained solvent and the fatty material in solution therein. The solids are removed from the filter, melted and the solvent content removed by distillation.

The filtrate containing the more unsaturated fat or fatty acids may either be further cooled to remove a second fraction or subjected to distillation to recover the solvent and its content of fatty material.

In commercial operations the filtration is preferably performed on a continuous filter and the distillation in continuous stills, the final traces of solvent being removed by stripping with open steam.

My invention is more fully illustrated by the following examples:

Example 1

100 parts of refined cottonseed oil was dissolved in 400 parts of 2-nitropropane. The solution was cooled in a jacketed vessel, the walls of which were scraped continuously to maintain a clean cooling surface. At a temperature of —9° C. crystallization commenced. Cooling was continued to —20° C. The crystallized solids were removed by filtration and the filter cake washed with 250 parts of solvent. The filter cake amounting to 39.9 parts was melted and the solvent removed by distillation. 19.3 parts of solid glyceride was recovered. The filtrate was evaporated and 80.7 parts of liquid glyceride recovered. This "winterized" cottonseed oil showed no clouding when held at 0° C. for over 18 days.

Example 2

Separation of tallow fatty acids.—100 parts of tallow fatty acids obtained by subjecting prime tallow to continuous pressure hydrolysis were dissolved in 400 parts of 2-nitropropane. The solution was cooled in a vertical tubular crystallizer equipped with two scraping blades rotating at 6 r.p.m. The solution was cooled to —5° C., filtered and the precipitated stearic acid washed with 250 parts of chilled solvent. The filtrate, including the wash solvent, was further cooled to —35° C. and the precipitated oleic acid removed by filtration and washed with 120 parts of solvent. The solvent was removed from the stearic and oleic fractions and the final filtrate evaporated to recover the more unsaturated acids. The following results were obtained:

|  | Stearic Acid | Oleic Acid | Residue Acids |
| --- | --- | --- | --- |
| Parts obtained, percent | 47 | 38 | 15 |
| Iodine Value | 5 | 84 | 112 |
| Titer, ° C | | —1 | |

Example 3

Separation of cottonseed oil mono- and polyunsaturated fatty acids.—100 pts. of cottonseed oil mono- and polyunsaturated fatty acids were dissolved in 400 pts. of 2-nitropropane. The solution was cooled to —27° C. The filter cake amounting to 50 parts was melted and the solvent removed by distillation. 20.3 parts of monounsaturated fatty acids were recovered possessing an iodine value of 96.5. Evaporation of solvent from the filtrate yielded 79.7 parts of polyunsaturated fatty acids with 145 iodine value.

Example 4

100 parts of another sample of commercial oleic acid having an iodine value of 89.3 was dissolved in 600 parts of 2-nitropropane. The solution was cooled to —30° C. The solvent was distilled from the filter cake to yield 70 parts of oleic acid containing 3.7 parts of polyunsaturated acids and having an iodine value of 81.0 and a titer of 7.5° C.

By comparison, a separation at the same concentration utilizing 95% methanol required cooling to —40° C. to yield oleic acid of comparable quality; yield 69.7 parts of oleic containing 3.1% polyunsaturated acids and having an iodine value of 80.4 and a 7.5° C. titer.

Example 5

Separation of partially hydrogenated triglycerides.—100 parts of a partially hydrogenated, mixed soya and cottonseed triglycerides were dissolved in 400 parts of 2-nitropropane by heating the mixture to 35° C. The solution was then cooled to 20° C., filtered and the filter cake washed with 250 parts of solvent prechilled to 20° C. Removal of entrained solvent from the filter cake yielded 37 parts of triglyceride with a 49–50° C. softening point. The filtrate was further cooled to 0° C., filtered and the filter cake washed with 150 parts of prechilled solvent. Evaporation of solvent from the second filter cake yielded 38 parts of triglyceride having a softening point of 36–37° C. Distillation of solvent from the filtrate fraction yielded 25 parts of oil.

Example 6

A mixture of saturated and unsaturated fatty acids distilled from tall oil (and made up of approximately 51.4% oleic acid, 44.6% linoleic acid, and the balance various saturated acids, rosin and unsaponifiable constituents) was dissolved in 1-nitropropane to form a 20% solution at 25° C. This solution was then cooled to —20° C., at which temperature there was present a finely divided, rather slimy crystalline phase. The latter was filtered off under 15 p.s.i. pressure using a Büchner funnel provided with No. 1 whatman paper. It was found that approximately 75 seconds were required to obtain a "dry" cake. In a comparable experiment conducted under the same conditions as those described above, but with 2-nitropropane instead of 1-nitropropane, the crystalline phase obtained had a much coarser structure. It was found that the filter time for this product was approximately 20% shorter than that for the 1-nitropropane product, the time here being 59 seconds.

Example 7

A mixture of saturated and unsaturated fatty acids, as derived from the splitting of tallow glycerides, was dissolved, in one case in 1-nitropropane, and in the other in 2-nitropropane, at 35° C. to form a 20% solution. This solution was then cooled to 0° C. to effect crystallization of the more saturated components present, following which the system was suction filtered to recover the solid acids present. The latter acids were then heated to 95° C. under 135 mm. Hg. abs. to drive off the nitropropane solvent, after which the fatty acid residue was distilled in vacuo, the conditions being 250° C. and 3 mm. Hg. abs. The distilled fatty acids were then bleached with 3% Super Filtrol clay, and the system filtered to remove the clay. The product so recovered was substantially water-white. More properly, its color was 94Y/98R as determined by A.O.C.S. Test Method Cc13c–50 using a Coleman, Jr. spectrophotometer. In this method color transmission at 440 millimicrons (yellow) and 550 millimicrons (red) is measured. A result expressed as 100Y/100R would mean that the sample was entirely free of both yellow as well as red coloration, while a number such as 70Y/91R would mean that the sample was somewhat yellow but was generally free of red coloration.

Returning to the operation described above, the bleached, filtered fatty acids which had spectrophotometer values of 94Y/98R, were given an accelerated aging test involving heating of the product at 205° C. for 2 hours, said treatment being calculated to develop such coloration as would otherwise naturally occur in the sample as it stood at ambient temperatures for several weeks. The heated sample was then cooled to 100° C. and tested for color in the manner described in the aforesaid test method. In the case of a sample prepared using 1-nitropropane, the product obtained was obviously of a yellow-reddish color, and its spectrophotometer values were 49Y/80R. In the case of the product prepared using 2-nitropropane, no reddish coloration was visible to the naked eye, though the sample did have a slight yellow tinge. Specifically, its spectrophotometer values were 70Y/91R. By way of contrast, samples prepared using a methanol solvent, which has been found to give about the least possible discoloration of any known solvent, gave spectrophotometer values of 74Y/93R.

From the above data, which is representative of that obtained in many other runs using a variety of fatty acid mixtures of natural origin, it is concluded that the color stability problem posed by the use of 1-nitropropane is so severe as to make use of this material entirely impractical from a commercial standpoint. On the other hand, the product obtained when 2-nitropropane is used as the solvent is regarded as being of extremely high quality from the color stability and other product specification standpoints.

Having described this invention, I claim:

1. A process for the separation of materials selected from the group consisting of higher fatty acids and the glycerides of said acids, said materials having different degrees of unsaturation, which comprises dissolving the fatty materials in 2-nitropropane, cooling the solution to precipitate a portion of the more saturated constituents, filtering off said precipitate, and recovering the fatty materials from the precipitate by evaporation of the solvent present therein.

2. The process of claim 1 in which successively more unsaturated fractions are recovered by further cooling the filtrate remaining after each precipitated fraction is removed from the solution.

3. A process for separating oleic acid from mixed fatty acids containing oleic acid, linoleic acid and linolenic acid which comprises dissolving the mixed fatty acids in 2-nitropropane cooling the solution to a temperature of from —15° to —35° C. to precipitate the oleic acid, removing the precipitated oleic by filtration, and separately recovering the oleic acid from the precipitate and the linoleic and linolenic acids from the filtrate by evaporation of the solvent.

4. A process for separating tall oil fatty acids which comprises dissolving from 20 to 25% by weight of tall oil fatty acids in 2-nitropropane, cooling the solution to —20° to —35° C. to precipitate an oleic acid rich phase, removing said precipitated oleic acid by filtration, washing the filter cake with fresh solvent, and separately recovering the oleic acid from the cake and linoleic and linolenic acids from the filtrate by evaporation of the 2-nitropropane therefrom.

5. A process for separating fatty glycerides having different degrees of unsaturation into more solid and more liquid fractions which comprises dissolving up to 25% by weight of the fatty glyceride in 2-nitropropane, cooling the solution by progressive stages to precipitate successive progressively more liquid fractions each of which is removed from the solution before the next cooling stage in initiated, and separately recovering the glycerides from said precipitated fractions as well as the glycerides remaining in the residual filtrate by evaporation of the solvent therefrom.

6. The process of claim 5 in which the fatty glyceride is selected from the group consisting of partially hydrogenated cottonseed oil, partially hydrogenated soya oil, and partially hydrogenated mixtures of soya and cottonseed oils.

7. A process for separating mixtures of fatty glycerides having different degrees of unsaturation into a relatively more saturated fraction and a relatively more unsaturated fraction, which comprises forming a warm solution of the glyceride mixture in 2-nitropropane, cooling the solution to approximately room temperature to precipitate a relatively more saturated glyceride fraction, separating said precipitated fraction, further cooling the residual solution to precipitate a relatively more unsaturated fraction, and separating said relatively more unsaturated fraction from the residual solution.

8. The process of claim 7 wherein the initial separation step is effected at approximately 20° C. and wherein the second separation step is effected at approximately 0° C.

9. A process for the separation of a saturated higher fatty acid from admixture with an unsaturated higher fatty acid which comprises dissolving said admixture in 2-nitropropane, cooling to separate as a solid the saturated higher fatty acid.

10. A process for the separation of mono-unsaturated higher fatty acid from admixture with a poly-unsaturated higher fatty acid which comprises dissolving said admixture in 2-nitropropane, cooling to separate as a solid the mono-unsaturated higher fatty acid.

References Cited

UNITED STATES PATENTS

| 2,450,235 | 9/1948 | Gee | 260—419 |
| 2,576,841 | 11/1951 | Leaders et al. | 260—419 |
| 3,028,435 | 4/1962 | Andrikides | 260—643 |

FOREIGN PATENTS

| 566,404 | 11/1958 | Canada. |
| 573,524 | 4/1959 | Canada. |

ALEX MAZEL, *Primary Examiner.*

T. E. LEVOW, ABRAHAM H. WINKELSTEIN, CHARLES B. PARKER, *Examiners.*

L. M. SHAPIRO, D. D. HORWITZ, A. H. SUTTO, J. A. NARCAVAGE, *Assistant Examiners.*